United States Patent [19]
Greinacher et al.

[11] 3,715,424
[45] Feb. 6, 1973

[54] PROCESS OF SEPARATING YTTRIUM AND LANTHANUM THROUGH LUTETIUM FROM MIXTURES OF SUCH ELEMENTS

[76] Inventors: Ekkehard Greinacher, Ahornstr. 41, Essen; Werner Fischer, Appelstr. 18; Martin Dähne, Callinstr. 46, both of Hannover, all of Germany

[22] Filed: June 3, 1971

[21] Appl. No.: 149,757

Related U.S. Application Data

[63] Continuation of Ser. No. 768,737, Oct. 18, 1968, abandoned.

[30] Foreign Application Priority Data

Nov. 8, 1967 Austria..........................A 10063/67

[52] U.S. Cl.................................423/21, 23/312 ME
[51] Int. Cl. .............................................C22b 59/00
[58] Field of Search........................23/18–20, 22, 23, 23/312 ME, 87 R

[56] References Cited

UNITED STATES PATENTS 3,110,556  11/1963  Peppard et al. ..........................23/23

FOREIGN PATENTS OR APPLICATIONS 1,052,968  7/1956  Germany..................................23/22

OTHER PUBLICATIONS

Appleton et al., "Journal of the American Chemical Soc.", Vol. 63, 1941, pp. 2029.

*Primary Examiner*—Herbert T. Carter
*Attorney*—McGlew and Toren

[57] ABSTRACT

Process of separating at least two of the elements yttrium and lanthanum through lutetium from a mixture of such elements by distributing the thiocyanates of the elements between an aqueous phase and an organic solvent phase. The concentration of the elements in the aqueous phase is at least 1.5 gram-atoms per liter, but preferably between 2 gram-atoms per liter and the saturation limit. The thiocyanate concentration in the aqueous phase is between 0.01 – 3 mole per liter.

2 Claims, 1 Drawing Figure

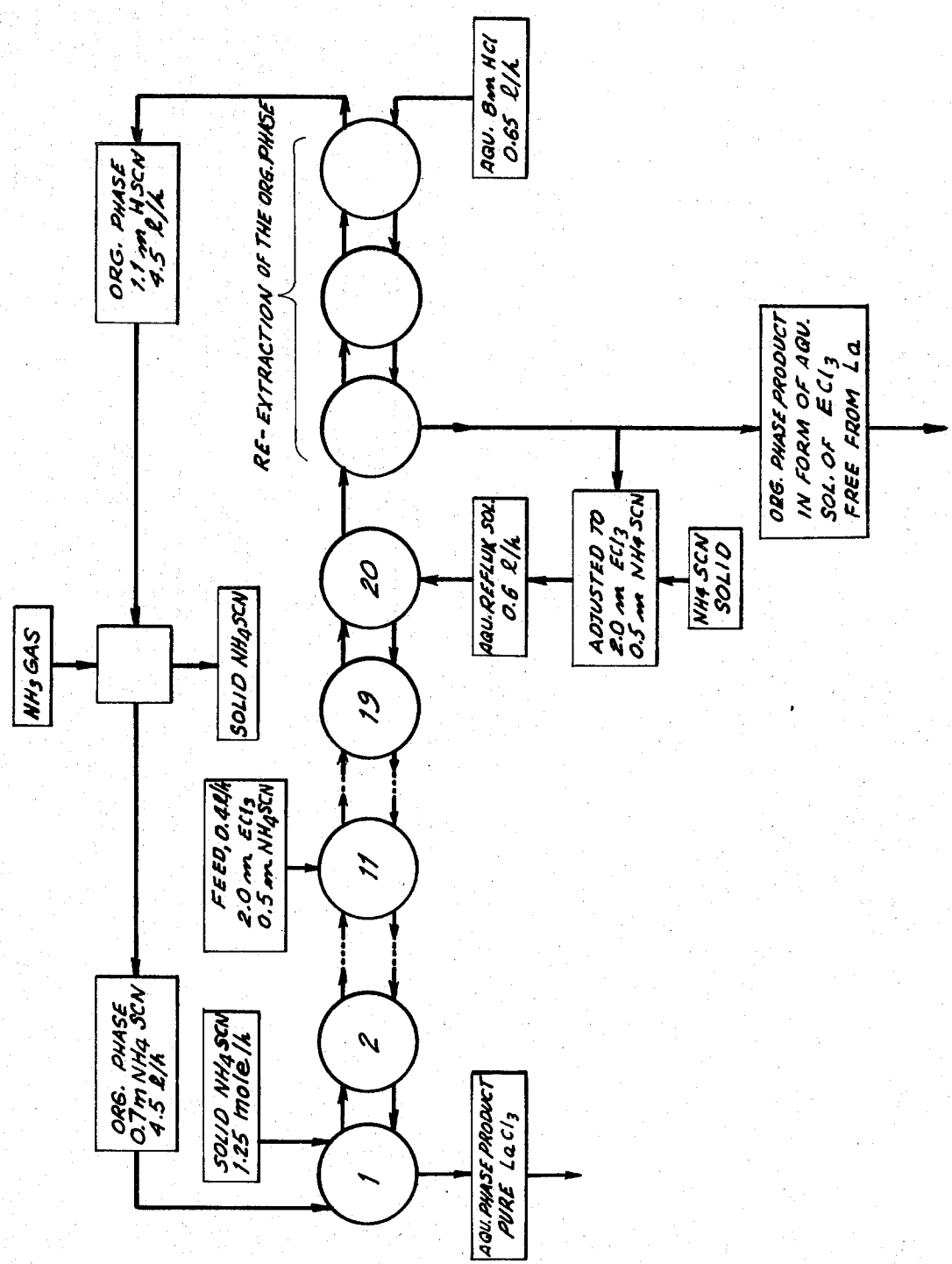

PROCESS OF SEPARATING YTTRIUM AND LANTHANUM THROUGH LUTETIUM FROM MIXTURES OF SUCH ELEMENTS

This application is a continuation of ser. No. 768,737, filed Oct. 18, 1968 and now abandoned.

SUMMARY OF THE INVENTION

This invention generally relates to solvent extraction and is particularly directed to a solvent extraction procedure for separating selected rare earth elements from mixtures containing a plurality of rare earths by distributing the rare earths in the form of their thiocyanates between an aqueous phase and an organic solvent phase.

The term "rare earths" as used herein is deemed to refer to the elements of atomic numbers 57 (lanthanum) through 71 (lutetium) and yttrium which bears atomic number 39.

The term "lanthanoides" as used herein, by contrast, is deemed to refer solely to the elements lanthanum through lutetium.

It has previously been suggested to separate rare earth elements from rare earth mixtures by solvent extraction. German Pat. No. 1,052,968 thus discloses that in the distribution of rare earth elements between an aqueous phase and an organic solvent phase in the presence of thiocyanates, the individual rare earth elements are distributed in the respective phases to a varying extent. A major factor in the distribution is the thiocyanate concentration. It has thus been observed that the separating effects are very much dependent on the concentration of the thiocyanate. If the thiocyanate concentration is very high as it may, for example, be obtained by saturation of both phases with ammonium thiocyanate, the distribution of all the lanthanoides is increasingly in favor of the organic phase, the yttrium accompanying the heavy lanthanoide element erbium. Solvent extraction with very high thiocyanate concentration is thus generally suitable for the separation of the lanthanoide elements from each other, a particularly significant separating effect being obtained in respect to the separation of the yttrium from the light lanthanoides. By contrast, upon decreasing thiocyanate concentration in the system, the separating effects within the lanthanoide series are considerably less pronounced. The yttrium, however, changes at lower thiocyanate concentration its position relative to the lanthanoide series and accompanies then the light lanthanoide elements. By combination of the two conditions referred to, yttrium preparations of exceptionally high purity can thus be obtained.

The first-mentioned procedure, wherein a high thiocyanate concentration is employed has, however, several important drawbacks which make practical utilization difficult. It should thus be appreciated that the preparation of the thiocyanate-rich starting solutions of the rare earth mixtures to be separated entails a cumbersome process step which leads either to losses of rare earths and thiocyanates or is apt to be interfered with by the occurrence of hydrolysis. The same applies in respect to the aqueous solutions which are required for partial reflux. Reflux has necessarily to be used in order to maintain a suitable concentration of the rare earths within the plant. A further drawback is due to the fact that in multi-stage solvent extraction plants, as they are used for conducting commercially interesting separation, exceedingly large thiocyanate quantities have to be continuously fed into the system. For economic reasons, the recovery of the thiocyanate is a necessity which, in turn, requires concentration by evaporation of large amounts of aqueous solutions. This, of course, is a cumbersome, time-consuming and expensive procedure resulting in significant losses.

It is a primary object of this invention to overcome the drawbacks and disadvantages of the prior art solvent extraction procedures and to provide a process according to which rare earth elements can be readily separated from each other in substantially quantitative manner while maintaining a relatively low thiocyanate concentration in the system.

It is also an object of the invention to provide a procedure of the indicated kind which is simple to carry out and does not result in substantial losses of either rare earths or thiocyanate.

Generally, it is an object of this invention to improve on the art of solvent extraction of rare earth elements as presently practiced.

Briefly, and in accordance with this invention, it has been ascertained that separation effects previously obtained only at the highest thiocyanate concentrations are also obtained at much lesser thiocyanate concentrations, if the concentration of the rare earths in the aqueous phase amounts to at least 1.5 gram-atoms per liter. The preferred concentration of the rare earths in the aqueous phase is between 2 gram-atoms per liter and the saturation limit.

The rare earths are advantageously supplied to the process in the form of aqueous solutions of readily water-soluble salts, preferably the chlorides.

The thiocyanate concentration of the aqueous phase in equilibrium with the organic phase should be between 0.01 and about 3 m. A preferred thiocyanate concentration for the inventive purpose is about 1 m.

In proceeding in the indicated manner, the drawbacks and difficulties of the preparation of the solutions previously referred to are completely eliminated. Furthermore, the circulating thiocyanate amount is 3 to 5 times smaller than in the prior art procedures. The recovery of the thiocyanate does no longer require concentration by evaporation of the solutions, but may be effected in a relatively simple manner, for example by precipitation. The inventive procedure thus offers an important technical simplification of the separation procedure.

As in the prior art procedures in which the system is saturated with thiocyanate, the lanthanoides in the inventive procedure are also distributed increasingly in favor of the organic phase. Significant separation effects between the light lanthanoides — lanthanum through samarium — are achieved. The yttrium accompanies samarium. The procedure is, inter alia, suitable for the separation of lanthanum from all other lanthanoides and yttrium or for the separation of the lightest lanthanoides — lanthanum, cerium, praseodymium and neodymium — from the heavier lanthanoide elements samarium through lutetium and yttrium.

The inventive procedure is advantageously carried out in a multi-stage countercurrent solvent extraction plant. Different apparatus, known per se, and comprising mixer-settlers, all kinds of extraction columns and the like may be used. Suitable apparatus of this kind has been described by Werner Fischer and Otto Jübermann in Chemie-Ingenieur-Technik, Volume 23, page 299 (1951), FIG. 3.

A preferred embodiment of the inventive procedure is characterized in that the required amount of thiocyanate is supplied to the separating process in the form of a readily soluble thiocyanate, preferably ammonium thiocyanate or alkali metal thiocyanate. If the process is carried out in a multi-stage solvent extraction plant, the thiocyanate is advantageously introduced at both ends of the plant and, if desired, also partially in conjunction with the solution of the rare earth mixture to be separated.

In multi-stage countercurrent solvent extraction plant operation, the procedure is advantageously carried out with partial reflux at both ends of the plant. At that end of the plant to which the organic solvent is supplied, the extent of the reflux is regulated by controlling the amount of the readily soluble thiocyanate supplied to the same end of the plant in relation to the amount of the rare earth mixture to be separated, which latter is fed to the center of the plant. At the other end of the plant, the rare earths can be quantitatively re-extracted in a simple manner from the discharged organic phase. This may be accomplished by means of aqueous hydrochloric acid. In doing so, the hydrogen ions are taken up by the organic phase to form thiocyanic acid with thiocyanate, until the pH of the aqueous solution has assumed a value of about 3 to 4. A portion of the aqueous rare earth chloride solution thus formed is recycled to the same end of the plant as reflux solution. However, the organic phase, prior to the hydrochloric acid treatment, may be partially re-extracted with water and the aqueous rare earth thiocyanate solution thus obtained may be combined with the above-described rare earth chloride solution. By means of reflux it is thus possible directly to recycle to the plant a portion of the thiocyanate ions.

In respect to the organic solvent of the organic phase, oxygen-containing solvents as, for example, esters, ethers, and ketone are suitable. More viscous solvents as, for example, phosphoric acid esters, are advantageously diluted in known manner with an inert second solvent as, for example, a higher boiling hydrocarbon. Also a viscous solvent with good extracting capacity as, for example, tributylphosphate, may be mixed with a solvent of lesser viscosity and lesser extracting effect as, for example, a higher ketone.

The invention will now be described by several Examples, it being understood that these Examples are given by way of illustration and not by way of limitation and that many changes may be effected without affecting in any way the scope and spirit of the invention as recited in the appended claims.

EXAMPLE 1

This experiment was carried out in a countercurrent solvent extraction plant which had 20 stages. Each stage consisted of a mixer-settler as described by Werner Fischer and Otto Jübermann in Chemie-Ingenieur-Technik, Volume 23, page 299 (1951), FIG. 3. The plant was operated as follows: The starting material was an aqueous solution of a mixture of the chlorides of 45 La, 1.5 Ce, 7 Pr, 39 Nd, the remainder being samarium through lutetium and yttrium. The numbers refer to atom percent. The chlorides were dissolved in water together with ammonium thiocyanate constituting the feed solutions, the amounts of the chlorides and ammonium thiocyanate being such that the solution was 2.0 molar in respect to the chlorides of the rare earths and 0.5 molar in respect to thiocyanate. Under conditions of steady state, the feed solution referred to was supplied to stage 11 with a rate of 0.4 liter per hour; 4.5 liters per hour of a mixture of tri-n-butylphosphate and kerosene in a volume ratio of 1 : 1 were supplied to stage 1; moreover, stage 1 received 4.4 mole of NH4SCN per hour which was partly dissolved in the organic phase, partly added as solid salt; 0.6 liter per hour of aqueous "reflux solution", to be defined hereinafter, was supplied to stage 20. The organic phase discharged from stage 20 was completely liberated of its content of rare earths by re-extraction with aqueous hydrochloric acid. The aqueous rare earth chloride solution thus obtained, and after it had assumed a pH value of about 3 to 4, was partially withdrawn as that fraction which contained the rare earths, except lanthanum, and was partially admixed with ammonium thiocyanate and adjusted to contain 2.0 mole of rare earth chloride and 0.5 mole of NH4SCN per liter. This latter fraction served as the reflux solution previously referred to. The aqueous solution discharged from stage 1 contained the lanthanum. Analysis indicated that it contained less than 100 ppm of cerium, calculated on the lanthanum, and was substantially free from all other rare earths. The lanthanum yield amounted to 99 percent.

The organic phase, after the re-extraction of the rare earths by means of hydrochloric acid, contained thiocyanic acid. This acid was neutralized with gaseous ammonia. In doing so, a portion of the formed ammonium thiocyanate was obtained in the form of a solid precipitate. This solid precipitate was separated and again supplied to the solvent extraction plant. 0.7 mole of NH4SCN per liter remained dissolved in the organic phase. The organic solution was directly recycled to stage 1.

The operation according to this Example is schematically indicated in attached flow sheet.

EXAMPLE 2

Twenty-eight mixer-settlers (stages) were combined into a countercurrent solvent extraction plant. The plant was operated with a starting material which contained, in atom percent, 0.8 La, 6 Ce, 1.2 Pr, 5 Nd, 6.5 Sm, 51 Y, the remainder being Eu through Lu. From this mixture, an aqueous chloride solution of a pH value of about 3 to 4 was prepared which contained a total of 2.9 gram-atoms of rare earth per liter and 1 mole of NH4SCN per liter. When the approach to steady state had finished, the plant was operated in the following way: Stage 8 received 0.4 liter per hour of the starting solution described above; 7 liters per hour of a mixture of equal volumes of tri-n-butylphosphate and kerosene were fed to stage 1; furthermore, stage 1 was supplied with 7.2 mole of NH4SCN per hour which was partly dissolved in the organic phase, the rest being added as solid salt; 0.6 liter per hour of aqueous reflux solution was supplied to stage 28. This reflux solution, as in Example 1, was obtained by re-extraction of the organic phase with hydrochloric acid, the solution, however, having been adjusted to a content of 2.9 gram-atoms of rare earths and 1 mole of NH₄SCN per liter. That portion of the re-extracted solution not required for reflux purposes was withdrawn. It contained the elements yttrium and Sm through Lu in a substantially 100 percent yield, but contained less than 50 ppm Nd, calculated on the total of the rare earths present. A still lesser content of La, Ce and Pr was observed. On the other hand, the aqueous solution obtained from stage 1 contained the elements La, Ce, Pr and Nd, but less than 100 ppm Sm and less than 30 ppm Y, calculated on the total of all rare earths present. The amounts of the elements Eu through Lu were already at stage 3, respectively at stages of higher numbers, below the detection limit.

What is claimed is:

1. A process of separating a mixture of two rare earth elements selected from the group of elements having atomic numbers 57 through 71 and yttrium by solvent extraction, wherein the mixture, in the presence of thiocyanate, is distributed between an aqueous phase and an organic solvent phase consisting essentially of a substantially water immiscible organic solvent being triloweralkyl phosphoric acid ester or triloweralkyl phosphoric acid ester diluted with a hydrocarbon of high boiling point which comprises providing an aqueous solution, said solution containing at least 1.5 gram-atoms per liter of said mixture of elements and having a thiocyanate concentration of between about 0.01 – 3 mole per liter and contacting said organic solvent and said aqueous solution in countercurrent to each other, whereby the element with lower atomic number is enriched in the aqueous solution while the element with higher atomic number is enriched in the organic solvent, yttrium, when present, behaving as an element having the atomic number of samarium.

2. A process as claimed in claim 1, wherein said aqueous solution is supplied with said elements being present in the form of their chlorides.

* * * * *